(12) United States Patent
Sandstrom

(10) Patent No.: US 11,723,430 B2
(45) Date of Patent: Aug. 15, 2023

(54) SHOE WITH OUTSOLE CONTAINING VEGETABLE OIL EXTENDED HIGH TG STYRENE/BUTADIENE ELASTOMER

(71) Applicant: The Goodyear Tire & Rubber Company, Akron, OH (US)

(72) Inventor: Paul Harry Sandstrom, Cuyahoga Falls, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 343 days.

(21) Appl. No.: 17/024,895

(22) Filed: Sep. 18, 2020

(65) Prior Publication Data
US 2022/0087360 A1 Mar. 24, 2022

(51) Int. Cl.
| | | |
|---|---|---|
| A43B 13/04 | (2006.01) |
| A43B 13/12 | (2006.01) |
| A43B 13/18 | (2006.01) |
| C08L 9/06 | (2006.01) |
| C08L 91/00 | (2006.01) |
| C08L 93/04 | (2006.01) |
| C08L 9/02 | (2006.01) |
| C08K 3/36 | (2006.01) |
| C08K 3/04 | (2006.01) |
| C08K 11/00 | (2006.01) |
| C08K 5/372 | (2006.01) |
| C08K 5/548 | (2006.01) |

(52) U.S. Cl.
CPC ............ *A43B 13/04* (2013.01); *A43B 13/122* (2013.01); *A43B 13/187* (2013.01); *C08K 3/04* (2013.01); *C08K 3/36* (2013.01); *C08K 5/372* (2013.01); *C08K 5/548* (2013.01); *C08K 11/005* (2013.01); *C08L 9/02* (2013.01); *C08L 9/06* (2013.01); *C08L 91/00* (2013.01); *C08L 93/04* (2013.01)

(58) Field of Classification Search
CPC ..... A34B 13/04; A43B 13/122; A43B 13/187; C08L 9/06; C08L 91/00; C08L 93/04; C08L 9/02; C08K 3/36; C08K 11/005; C08K 5/372; C08K 5/548; C08K 3/04
See application file for complete search history.

(56) References Cited

U.S. PATENT DOCUMENTS

| | | |
|---|---|---|
| 3,576,911 A | 4/1971 | Maxey |
| 4,238,383 A | 12/1980 | Anderson |
| 4,479,296 A | 10/1984 | Sabins |
| 4,501,077 A | 2/1985 | Young |
| 5,755,045 A | 5/1998 | Mashita et al. |
| 6,620,871 B2 | 9/2003 | Wilson, III |
| 6,817,114 B2 | 11/2004 | Bredael |
| 7,119,147 B2 | 10/2006 | Kikuchi |
| 7,211,611 B2 | 5/2007 | Wilson, II |
| 8,044,118 B2 | 10/2011 | Sakaki et al. |
| 9,060,566 B2 | 6/2015 | Rapo-Brunet |
| 9,902,837 B2 | 2/2018 | Moutinho et al. |
| 10,435,545 B2 | 10/2019 | Kerns et al. |
| 2005/0131127 A1 | 6/2005 | Wilson |
| 2007/0142518 A1 | 6/2007 | Hsu et al. |
| 2013/0289183 A1 | 10/2013 | Kerns et al. |
| 2016/0068659 A1 | 3/2016 | Moutinho et al. |
| 2017/0058112 A1 | 3/2017 | Kerns et al. |
| 2019/0225778 A1 | 7/2019 | Weydert et al. |
| 2020/0087489 A1 | 3/2020 | Isitman |
| 2020/0146392 A1* | 5/2020 | Sandstrom ............ A43B 13/22 |
| 2020/0146393 A1* | 5/2020 | Sandstrom ........... C08K 5/5415 |
| 2020/0146394 A1 | 5/2020 | Sandstrom |

FOREIGN PATENT DOCUMENTS

| | | | |
|---|---|---|---|
| CN | 110250646 A | 9/2019 | |
| EP | 3513988 A1 * | 7/2019 | ........... B60C 1/0016 |

OTHER PUBLICATIONS

European Search Report for Serial No. EP21197285 dated Feb. 25, 2022.
Office Action for Korean Application No. 2021-0121703, dated Mar. 27, 2023.
Chinese Office Action for Application No. 202111093306.9, dated Mar. 18, 2023.

* cited by examiner

Primary Examiner — Robert D Harlan
(74) Attorney, Agent, or Firm — Mandy B. Willis

(57) ABSTRACT

A shoe comprising an outsole, where the outsole is comprised of a rubber composition comprised of (A) diene-based elastomer comprising: (1) from about 20 to about 45 phr of high Tg SSBR pre-extended with vegetable oil, wherein said SSBR has a Tg in a range of from about −20° C. to about +10° C. and a bound styrene content in a range of from about 25 to about 50 percent and a vinyl 1,2-content in a range of from about 10 to about 80 percent based on butadiene content, (2) from 55 to about 80 phr of at least one additional diene-based elastomer comprising of at least one of polybutadiene, cis 1,4-polyisoprene rubber, and acrylonitrile-butadiene rubber, and (B) about 20 to about 70 phr of reinforcing filler comprised of a combination of carbon black and silica where the filler is comprised of from about 50 to about 100 weight percent silica.

15 Claims, No Drawings

SHOE WITH OUTSOLE CONTAINING VEGETABLE OIL EXTENDED HIGH TG STYRENE/BUTADIENE ELASTOMER

BACKGROUND

It is sometimes desirable for footwear to have a rubber sole intended to permit surface engagement comprised of a rubber composition to promote traction of the footwear sole's surface engaged with an external surface (e.g. ground) and to aid in promoting adaptability of the rubber sole over a wide range of atmospheric temperatures.

It is sometimes desirable for footwear to have a rubber sole intended to permit surface engagement comprised of a rubber composition to promote traction of the footwear sole's surface engaged with an external surface (e.g., ground) and to aid in promoting adaptability of the rubber sole over a wide range of atmospheric temperatures.

A conventional article of footwear includes a combination of two primary elements, namely an upper portion and a sole portion. The sole portion contains a sole with an outer surface intended to permit ground (external surface) engagement. The upper portion of the footwear provides a covering for the foot of the wearer of the footwear and positions the foot with respect to the associated sole portion. The sole portion is secured to a lower part of the upper portion of the footwear and, in practice, is intended to be positioned between the upper portion and external surface to which the sole is intended to permit contact. The sole portion provides traction through its outer surface upon engagement with an external surface and also aids in controlling foot balance and control for the footwear. Accordingly, the upper portion and associated sole portion secured to the upper portion operate in a cooperative combination to provide a footwear structure suitable for one or more ambulatory activities such as, for example, walking, running and sports related activities.

Shoes are sometimes desired which have high performance soles which promote traction and durability.

It is desired to provide shoe soles containing a high Tg (high glass transition temperature property) solvent solution polymerization prepared styrene/butadiene rubber (SSBR) to promote wet traction for the rubber composition.

For such purpose, it is desired for the SSBR to have a high Tg of at least −20° C. and desirably in a range of from about −20° C. to about +10° C. It is desired for the high Tg SSBR to have a bound styrene content in a range of from about 25 to about 50, alternately from about 25 to about 40, percent. It is further desired for the high Tg SSBR to have a vinyl 1,2-content based on its polybutadiene portion of at least about 10, alternately in a range of from about 10 to about 80, or alternatively in a range of from about 20 to about 70, percent.

Reinforcing filler for such rubber composition is desired to be comprised of a combination of rubber reinforcing carbon black and precipitated silica (amorphous synthetic precipitated silica) composed primarily of precipitated silica, desirably at least about 50 to about 100, alternately about 70 to about 99 weight percent precipitated silica. The reinforcing filler is to contain silica coupler (silica coupling agent) for precipitated silica.

It is known that such high Tg SSBR's may be extended with petroleum based rubber processing oil at the SSBR manufacturing facility by blending the petroleum oil with an SSBR polymerizate (polymerization cement comprised of the high Tg SSBR and solvent used for its preparation by polymerization of styrene and 1,3-butadiene monomers) prior to recovery of the high Tg SSBR from its polymerizate and thereby prior to blending the high Tg SSBR with rubber compounding ingredients, although additional petroleum based rubber processing oil may thereafter be blended with the high Tg SSBR containing rubber composition which may sometimes be referred to as "free addition" of the petroleum based oil instead of such "extending" of the high Tg SSBR.

The term "extending", as above indicated, is used to refer to (to describe) pre-blending of the petroleum based oil with the high Tg SSBR (a high viscosity, high molecular weight SSBR) in a relatively low viscosity solvent based cement form of the SSBR. A composite of the petroleum based oil and SSBR is thereafter recovered from the solvent cement (by removing the solvent) as a petroleum based oil "extended" SSBR. The oil extended high Tg SSBR is provided in contrast to free addition of the petroleum based oil to a significantly higher viscosity high Tg SSBR or to the high Tg SSBR containing rubber composition by addition of the petroleum oil to a rubber mixer.

For this invention, it is desired to provide a rubber composition comprised of cis 1,4-polybutadiene rubber and the high Tg SSBR to promote the shoe sole traction yet it is also desired to reduce the Tg of the rubber composition to promote the traction at lower temperatures by thereby reducing its stiffness as may be evidenced by a reduction of its storage modulus (E').

For such reduction in Tg of the rubber composition, it desired to evaluate providing the high Tg SSBR in a form of an extended SSBR with vegetable triglyceride oil in a sense of pre-blending the vegetable oil with the high Tg SSBR before recovery from its polymerization cement, instead of the SSBR being extended with petroleum based oil, to thereby evaluate promoting a lower Tg for the rubber composition containing the high Tg SSBR to thereby promote a reduction of its stiffness (e.g. lower storage modulus G' and higher tan delta values for the rubber composition).

It is known that a vegetable oil such as for example soybean oil, or soy oil, has been used for mixing with various rubber compositions by free oil addition to the rubber composition rather than soy oil extension of the elastomer by addition to its cement at its point of manufacture.

In the description of this invention, the terms "compounded" rubber compositions and "compounds"; where used refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

SUMMARY

The present invention is directed to a shoe comprising an outsole, the outsole intended to be ground-contacting, where the outsole is comprised of a rubber composition comprised of, based on parts by weight per 100 parts by weight elastomer (phr):

(A) conjugated diene-based elastomer comprising:
  (1) from about 20 to about 45 phr of high Tg styrene/butadiene elastomer (SSBR) pre-extended with vegetable triglyceride oil, wherein said SSBR has a Tg in a range of from about −20° C. to about +10° C. and a bound styrene content in a range of from about 25 to about 50 percent and a vinyl 1,2-content in a range of from about 10 to about 80 percent based on butadiene content, (2) from 55 to about 80 phr of at least one additional conjugated diene-based elastomer comprising of at least one of polybutadiene, cis 1,4-polyisoprene rubber, and acrylonitrile-butadiene rubber, and (B) about 20 to about 70 phr of reinforcing filler comprised of a combination of rubber reinforcing carbon black and precipitated silica where the reinforcing filler is comprised of from about 50 to about 100 weight percent precipitated silica.

DESCRIPTION

There is disclosed a shoe comprising an outsole, the outsole intended to be ground-contacting, where the outsole is comprised of a rubber composition comprised of, based on parts by weight per 100 parts by weight elastomer (phr):

(A) conjugated diene-based elastomer comprising:
 (1) from about 20 to about 45 phr of high Tg styrene/butadiene elastomer (SSBR) pre-extended with vegetable triglyceride oil, wherein said SSBR has a Tg in a range of from about −20° C. to about +10° C. and a bound styrene content in a range of from about 25 to about 50 percent and a vinyl 1,2-content in a range of from about 10 to about 80 percent based on butadiene content,
 (2) from 55 to about 80 phr of at least one additional conjugated diene-based elastomer comprising of at least one of polybutadiene, cis 1,4-polyisoprene rubber, and acrylonitrile-butadiene rubber, and (B) about 20 to about 70 phr of reinforcing filler comprised of a combination of rubber reinforcing carbon black and precipitated silica where the reinforcing filler is comprised of from about 50 to about 100 weight percent precipitated silica.

In one embodiment, the high Tg SSBR is extended with about 5 to about 40, alternately about 5 to about 30, parts by weight vegetable triglyceride oil per 100 parts by weight of said high Tg SSBR.

In one embodiment, said high Tg SSBR has a vinyl 1,2-content, based on its polybutadiene component, in a range of from about 10 to about 80, alternately about 20 to about 70, percent.

In one embodiment, said rubber composition contains from zero to about 20, alternately up to about 10 or up to about 20, phr of freely added petroleum based oil (in contrast to containing petroleum based oil extended high Tg SSBR).

In one embodiment, said triglyceride vegetable oil is at least one of sunflower oil, rapeseed oil, canola oil, palm oil, and soybean oil, desirably comprised of at least one of soybean oil and sunflower oil.

In one embodiment, when the additional diene elastomer includes an acrylonitrile-butadiene rubber, the rubber composition includes from 0.1 to 10 phr of an epoxidized soybean oil.

In one embodiment, said high Tg SSBR is an end-functionalized high Tg SSBR with at least one functional group reactive with hydroxyl groups on said precipitated silica where said functional groups are comprised of at least one of alkoxy, amine, siloxy and thiol groups.

In one embodiment, said high Tg SSBR or end functionalized high Tg SSBR is tin or silicon coupled.

Various suitable solvent solution polymerization methods for preparing a high Tg SSBR by co-polymerizing styrene and 1,3-butadiene monomers are known in the art, for example, and without an intended limitation, as may be disclosed in one or more U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240; all of which are fully incorporated herein by reference.

The precipitated silica may, for example, be characterized by having a BET surface area, as measured using nitrogen gas, in the range of, for example, about 40 to about 600, and more usually in a range of about 50 to about 300, square meters per gram. The BET method of measuring surface area might be described, for example, in the *Journal of the American Chemical Society*, Volume 60, as well as ASTM D3037.

The precipitated silica may, for example, also be characterized by having a dibutylphthalate (DBP) absorption value, for example, in a range of about 100 to about 400, and more usually in a range of from about 150 to about 300, cc/100 g.

Various commercially available precipitated silicas may be used, such as, and not intended to be limiting, silicas from PPG Industries under the Hi-Sil trademark with designations 210, 243, etc.; silicas from Solvey with, for example, designations of Zeosil 1165MP and Zeosil 165GR, silicas from Evonik with, for example, designations VN2 and VN3 and chemically treated precipitated silicas (e.g. composite of pre-hydrophobated precipitated silica) such as for example Agilon™ 400 from PPG Industries.

Representative examples of rubber reinforcing carbon blacks are, for example, and not intended to be limiting, those with ASTM designations of N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991. Such rubber reinforcing carbon blacks may have iodine absorptions ranging from, for example, 9 to 145 g/kg and DBP numbers ranging from 34 to 150 cc/100 g.

The silica coupling agent(s) which may be provided with the precipitated silica for the rubber composition, may be comprised of, for example, (A) bis(3-trialkoxysilylalkyl) polysulfide containing an average of connecting sulfur atoms in its polysulfide bridge in range of from about 2 to about 4, alternately from about 2 to about 2.6, sulfur atoms, or (B) a combination of bis(3-trialkoxysilylproyl) polysulfides having an average of connecting sulfur atoms in their polysulfide bridges of:
 (1) from about 2 to about 2.6, and
 (2) from about 3.2 to about 4, (C) an organoalkoxymercaptosilane, or (D) a combination of said bis(3-trialkoxysilylalkyl) polysulfide and organoalkoxymercaptosilane silica coupling agents.

Representative of such bis(3-trialkoxysilylalkyl) polysulfide is bis(3-triethoxysilylpropyl) polysulfide.

Alternately, the precipitated silica may be pre-treated (pre-hydrophobated) with at least one of such silica coupling agent to form a composite thereof prior to addition to the rubber composition.

In one embodiment, said hydrophobic precipitated silica is provided as a product of hydrophilic precipitated silica pre-treated with a silica coupling agent prior to introduction to the rubber composition, where said silica coupling agent has a moiety reactive with hydroxyl groups on a precipitated silica and another different moiety interactive with a diene-based elastomer contained in the rubber composition. Therefore, the hydrophobic precipitated silica is provided as a pre-treated hydrophilic precipitated silica with a silica coupler comprised of, for example, at least one of bis(3-triethoxysilylpropyl) polysulfide and organomercaptoalkoxysilane which may also include an alkoxysilane. A hydrophilic precipitated silica is thereafter added to the rubber composition without a free addition of a silica coupler.

In another embodiment, said hydrophobated precipitated silica is provided as a hydrophilic precipitated silica treated in situ within the rubber composition with a silica coupling agent having a moiety reactive with hydroxyl groups on a precipitated silica and another different moiety interactive with a diene-based elastomer contained in the rubber composition. For such preparation, a hydrophilic precipitated silica is subsequently thereafter added to the rubber composition without additional coupling agent in a separate mixing step. The hydrophobic precipitated silica is thereby provided as a hydrophilic precipitated silica treated in situ within said rubber composition with a silica coupler comprised of, for example, at least one of bis(3-triethoxysilylpropyl) polysulfide and organomercaptoalkoxysilane prior to a separate addition of additional hydrophilic precipitated silica which may optionally include an alkoxysilane.

In one embodiment, as indicated, said silica coupling agent for treatment (hydrophobation) of said hydrophilic precipitated silica is comprised of bis(3-triethoxysilylpropyl) polysulfide containing an average of from about 2 to about 4 connecting sulfur atoms in its polysulfidic bridge or an organoalkoxymercaptosilane.

In one embodiment, as indcted, an alkoxysilane may also optionally be used, together with said silica coupling agent to hydrophobate the precipitated silica.

In practice, representative of said alkoxysilane is, for example, an alkoxysilane of the general formula (I):

$$Z_n\text{—Si—}R_{4-n} \qquad (I)$$

wherein R is a saturated alkyl radical having from one to 18, preferably from one to 8, carbon atoms such as, for example, methyl, ethyl, isopropyl, n-butyl and octadecyl radicals, n is a value of from 1 to 3 and Z is an alkoxy radical represented as $(R^1O)$—, wherein $R^1$ is a saturated alkyl radical having from one to 3 carbon atoms such as, for example, methyl, ethyl and isopropyl radicals, preferably at least one of methyl and ethyl radicals.

Representative examples of alkoxysilanes of Formula (I) are, for example, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Accordingly, said alkoxysilanes have an alkoxy group being reactive with the hydroxyl groups (e.g. silanol groups) contained on the surface of the precipitated silica aggregates.

The rubber composition may further comprise from about 0.1 to about 30, alternatively about 1 to about 20, phr of corncob granules comprised of granules of the woody ring of corncobs, wherein at least 90 percent of said corncob granules have an average diameter in a range of from about 20 to about 500, alternately from about 30 to about 300, microns.

When including such corncob granules, the sole may have corncob micro-protrusions and micro-cavities thereon formed by a release of a portion of said corncob granule protrusions from the footwear sole surface (for example by release, or ejection, of the corncob granule protrusions from the footwear sole surface resulting from a wearing, or abrading, away of the sole surface as it is being used). The combination of corncob granule micro-protrusions and of corncob granule promoted micro-cavities, are seen herein to provide a relatively rough texture to the footwear sole surface to thereby promote mechanical traction of the footwear sole over a substrate (e.g., ground) surface.

The solid footwear rubber sole containing corncob dispersion within the sole rubber composition may provide corncob micro-protrusions and micro-cavities on the rubber sole surface intended for substrate engagement, and is readily differentiated from and exclusive of a footwear sole comprised of closed cellular rubber.

In one embodiment, the rubber sole contains colored corncob granules having a color contrasting with the rubber sole. For such colored corncob granules, which may have singular or a plurality of colors in contrast to the color of the sole rubber composition to enhance their visibility, particularly the visibility of the corncob micro-protrusions, on a contrastingly colored sole surface background. Such colorant for the corncob granules may be, for example, a suitable dye or stain.

The corncob granules are conventionally manufactured by drying the woody ring portion, or fraction, of the corncob followed by grinding to produce the granules which are air cleaned and separated into various sizes by mesh screening. Such corncob granules may be provided, for example, by The Andersons, Inc., and sold as Grit-O Cobs®. For further corncob granule discussion, see Use of Fine-R-Cobs as a Filler for Plastics, by D. B. Vanderhooven and J. G. Moore, reprinted from the Internal Wire and Cable Symposium 1982.

In one embodiment, the rubber composition includes zinc rosinate where the zinc rosinate is the product formed in situ within the rubber composition of zinc oxide and freely added rosin acid.

In one embodiment, the rubber composition includes, based upon parts by weight per 100 parts by weight rubber (phr), about 1 to about 10, alternately about 3 to about 10, phr of zinc soap comprised of: (1) zinc rosinate as the product of zinc oxide and freely added rosin acid formed in situ within the rubber composition, or (2) a combination of zinc soaps comprised of: (a) about 25 to about 95, alternately about 50 to about 95 weight percent of said zinc rosinate, and (b) about 5 to about 75, alternately about 5 to about 50 weight percent of zinc salt as the product of zinc oxide and fatty acid formed in situ within the rubber composition, where said fatty acid contains, and desirably is comprised primarily of a combination of, at least one of stearic, palmitic and oleic acids.

In one embodiment, the rosin acids include at least one of gum rosin acid, wood rosin acid and tall oil rosin acid, and hydrogenated and disproportionate forms thereof, which are well known to those skilled in such art. For example, see "Rosin and Rosin Derivatives", found in the Encyclopedia of Chemical Technology, Second Edition, 1968, Pages 475 through 508.

In one embodiment, said footwear rubber sole contains said zinc rosinate based zinc soap within its rubber composition and on its outer surface (to which a portion thereof has autogenously migrated) intended for ground contacting, particularly when contacting wet surface.

It is readily understood by those having skill in the art that the vulcanizable rubber composition would be compounded by methods generally known in the rubber compounding art, such as, for example, mixing various additional sulfur-vulcanizable elastomers with said SSBR composite and various commonly used additive materials such as, for example, sulfur and sulfur donor curatives, sulfur vulcanization curing aids, such as activators and retarders and processing additives, resins including tackifying resins and plasticizers, petroleum based or derived process oils as well as vegetable triglyceride oil in addition to said triglyceride oil extended SSBR, fillers such as rubber reinforcing fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.5 to 6 phr being often preferred. Typical amounts of processing aids comprise about 1 to about 50 phr. Additional process oils, if desired, may be added during compounding in the vulcanizable rubber composition in addition to the extending soybean oil contained in the soybean oil extended SSBR. Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid comprise about 0.5 to about 3 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 1.5, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Often desirably the primary accelerator is a sulfenamide. If a second accelerator is used, the secondary accelerator is often desirably a guanidine such as for example a diphenylguanidine, a dithiocarbamate or a thiuram compound.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the shoe sole of the present invention may be generally carried out at conventional temperatures in a range of, for example, from about 150° C. to 200° C. Any of the usual vulcanization processes may be used such as heating in a press or mold with superheated steam or hot air. Such shoe soles can be built, shaped, molded and cured by various methods which are known and will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A shoe comprising an outsole, the outsole intended to be ground-contacting, where the outsole is comprised of a rubber composition comprised of, based on parts by weight per 100 parts by weight elastomer (phr):
    (A) conjugated diene-based elastomer comprising:
        (1) from about 20 to about 45 phr of high Tg styrene/butadiene elastomer (SSBR) pre-extended with vegetable triglyceride oil, wherein said SSBR has a Tg in a range of from about −20° C. to about +10° C. and a bound styrene content in a range of from about 25 to about 50 percent and a vinyl 1,2-content in a range of from about 10 to about 80 percent based on butadiene content,
        (2) from 55 to about 80 phr of at least one additional conjugated diene-based elastomer comprising of at least one of polybutadiene, cis 1,4-polyisoprene rubber, and acrylonitrile-butadiene rubber and combinations thereof, and
    (B) about 20 to about 70 phr of reinforcing filler comprised of a combination of rubber reinforcing carbon black and precipitated silica where the reinforcing filler is comprised of from about 50 to about 100 weight percent precipitated silica.

2. The shoe of claim 1, wherein additional conjugated diene-based elastomer comprises the acrylonitrile-butadiene rubber and the rubber composition further comprise from 0.1 to 10 phr of an epoxidized soybean oil.

3. The shoe of claim 1 where the high Tg SSBR is extended with about 5 to about 40 parts by weight vegetable triglyceride oil per 100 parts by weight of said high Tg SSBR.

4. The shoe of claim 1 wherein the vegetable triglyceride oil is comprised of at least one of soybean oil and sunflower oil.

5. The shoe of claim 1 wherein the amount of the vegetable triglyceride oil in the rubber composition ranges from 1 to 20 phr.

6. The shoe of claim 1 wherein the rubber composition further comprises a coupling agent selected from the group consisting of bis(3-triethoxysilylpropyl) polysulfides and organoalkoxymercaptosilanes and combinations thereof.

7. The shoe of claim 6 wherein the precipitated silica is pre-treated with at least one of said coupling agents.

8. The shoe of claim 1 wherein said rubber composition contains from zero to about 20 phr of freely added petroleum based rubber processing oil.

9. The shoe of claim 1 wherein the rubber composition further comprises from 0.1 to 30 phr of corncob granules.

10. The shoe of claim 1, wherein the rubber composition further comprises from 1 to 10 phr of zinc rosinate.

11. The shoe of claim 1 where the triglyceride vegetable oil is comprised of at least one of sunflower oil, rapeseed oil, canola oil, palm oil and soybean oil.

12. The shoe of claim 1 wherein the SSBR is an end-functionalized styrene/butadiene elastomer with functional groups reactive with hydroxyl groups on said precipitated silica comprised of at least one of alkoxy, amine, siloxy and thiol groups.

13. The shoe of claim 1 wherein the SSBR is tin or silicon coupled.

14. The shoe of claim 1 wherein said triglyceride vegetable oil is comprised of soybean oil.

15. The tire of claim 1 wherein said triglyceride oil is comprised of sunflower oil.

* * * * *